Patented Sept. 21, 1937

2,093,430

UNITED STATES PATENT OFFICE 2,093,430

OIL FILTER

Frederick H. Franklin and Thomas E. Aldham,
Providence, R. I.

No Drawing. Application August 12, 1936,
Serial No. 95,682

8 Claims. (Cl. 196—16)

This invention relates to the treatment of hydro-carbon oils, particularly such as are used for lubricating internal combustion engines such as are widely used in automobiles, and deals particularly with a filter for removing impurities of the oils; and has for one of its objects the provision of a filter medium which will not only remove solid or colloidally suspended particles from the oil but will also remove the acid impurity of the oil which accumulates during use largely from oxidation.

Another object of the invention is the removal and collection of all of these impurities from the oil in a filter which may be changed or replaced from time to time, as desired.

Another object of the invention is the selection of a material which will have the desired properties of neutralizing acidity and at the same time beneficially act in the removal of the solid particles from the oil and will be of such a character as to be insoluble and not easily miscible with the filtered oil and thus be retained in its given position with relation to the flow of the oil thereto and therethrough.

A further object of the invention is the provision of such an organic material having the properties above mentioned which will be inexpensive of procurement in the market, such for instance as triethanolamine.

When lubricating oil is used in an internal combustion engine such as a gasoline engine, it becomes contaminated with road dust, metal particles, the products of oxidation, acids and other impurities. Some of these substances are soluble in the oil and others are insoluble in the oil and may be removed by a suitable filter, being carried around in suspension, such for instance as colloidal suspension in the oil, and are more difficultly removable by a filter. Most of these impurities are injurious to the working surfaces of the engine because of their abrasive action or corrosive action on these surfaces; and it is desirable that these impurities be removed as fast as formed, that the lubricating value of the oil may remain at its highest efficiency for a longer time.

Filters for lubricating oils which remove the solid particles are known, and there have been attempts made to reduce or remove the acidity of used oil by treating the same with organic compounds in re-claiming the same in a special process after it was removed from use. Also, it has been known to use as a filter medium a substance of inorganic nature which may have the effect of somewhat reducing the oil acidity. Usually, however, when an inorganic substance reacts with the acids of the oil, water is formed or liberated or there is a splitting up of the molecules which previously have formed the acid to form some new substances which are not desirable in the oil. We have not known, however, that an organic substance has been used in the filter medium which has the property of neutralizing the acid of the oil by causing the acid radical and the H-ion to add to it and thus remove the acid by accumulating it with this organic substance, and further retaining the same in a filter along with the other impurities so that the whole may be removed and refreshed as occasion may require.

One of the qualities of the organic compound is that it is insoluble in the hydro-carbon engine oil and is not easily miscible with the oil and by being impregnated in the fibrous material remain positioned and not mechanically removed by the flow of the oil through the filter.

The materials which we have chosen for accomplishing this result are types of alkylolamine having the general formulae as follows:

$$NH_2C_nH_{2n}OH$$

$$NH(C_nH_{2n}OH)_2$$

$$N(C_nH_{2n}OH)_3$$

Each of these is in effect a substituted ammonia or ammonia alcohol and may be used in either of the forms as indicated by the above general formula in the mono-, di- or tri-hydroxy form. Triethanolamine, however, is the easier to handle and probably the least expensive in the market. It is also possible to use instead of the triethanolamine in these forms, trimethanolamine, or any of the hydroxyamines of the higher structure than the ethyl.

To utilize these substances in our filter, we use some porous material capable of absorbing the amine as the main body of the filter medium which may be cotton fibers such as cotton waste, if desired, and we impregnate this filter medium with a suitable quantity of this organic compound. The cotton fibers have the quality of being able to effectively filter out particles in the oil such as the carbon particles, possibly because of an electronic charge which occurs thereon of the opposite polarity from the polarity of the particles occurring in the oil and the alkylolamine serves to cause quick dispersion of the oil through the porous material.

A cartridge is prepared as follows:

About six ounces of selected cotton waste is pulled out into a loose, flat mass about 35" long and 5" wide. About one ounce of the commercial triethanolamine (which contains some diethanolamine or other impregnating compound) is added in a well-distributed stream, such as by a sprinkler, whereupon it penetrates the cotton fibers. The mass is then rolled up starting at one end and compressing continually and working the preparation into the fibers. The tightly compressed mass is then forced in a suitable cartridge, covered and sealed. The cartridge being generally the form of that in our co-pending applications.

In some cases, we may desire to use along with this organic substance a metal such as zinc, aluminum, cobalt, nickel, vanadium, or other compounds to obtain a catalyzing effect, or it may be used with an alkali such as a carbonate or a hydrate to enhance the action of the organic substance above specified.

When the acid of the oil adds to the organic substance above mentioned in the formula, the reaction, such for instance as with triethanolamine is as follows:

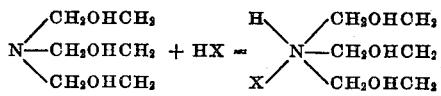

Where X is any acid radical, oleic and stearic being among the common forms occurring in the oil upon becoming acid.

We claim:

1. A filter for used oil adapted to be placed in the flow line of an engine, comprising a fibrous material assembled sufficiently loosely to allow flow of oil therethrough and yet sufficiently compact to filter out solid particles, and an alkylol amine impregnating said material.

2. A filter for used oil adapted to be placed in the flow line of an engine, comprising a fibrous material assembled sufficiently loosely to allow flow of oil therethrough and yet sufficiently compact to filter out solid particles, and monoethanolamine impregnating said material.

3. A filter for used oil adapted to be placed in the flow line of an engine, comprising a fibrous material assembled sufficiently loosely to allow flow of oil therethrough and yet sufficiently compact to filter out solid particles, and diethanolamine impregnating said material.

4. A filter for used oil adapted to be placed in the flow line of an engine, comprising a fibrous material assembled sufficiently loosely to allow flow of oil therethrough and yet sufficiently compact to filter out solid particles, and triethanolamine impregnating said material.

5. A filter for used oil adapted to be placed in the flow line of an engine, comprising cotton fibers assembled sufficiently loosely to allow flow of oil therethrough and yet sufficiently compact to filter out solid particles, and an alkylol amine impregnating said material.

6. A filter for used oil adapted to be placed in the flow line of an engine, comprising cotton waste assembled sufficiently loosely to allow flow of oil therethrough and yet sufficiently compact to filter out solid particles, and an alkylol amine impregnating said material.

7. A filter for used oil adapted to be placed in the flow line of an engine, comprising cellulose material assembled sufficiently loosely to allow flow of oil therethrough and yet sufficiently compact to filter out solid particles, and an alkylol amine insoluble in the oil and capable of reducing acid and impregnating said material.

8. A filter for oil in an engine, comprising a porous filter material assembled sufficiently loosely to allow flow of oil therethrough and yet sufficiently compact to filter out solid particles, and an alkylol amine impregnating said material to be contacted by the oil.

FREDERICK H. FRANKLIN.
THOMAS E. ALDHAM.